(12) United States Patent
Bansho

(10) Patent No.: US 10,964,279 B2
(45) Date of Patent: Mar. 30, 2021

(54) DISPLAY DRIVER, ELECTROOPTIC DEVICE, AND ELECTRONIC APPARATUS

(71) Applicant: SEIKO EPSON CORPORATION, Tokyo (JP)

(72) Inventor: Ryota Bansho, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/253,769

(22) Filed: Jan. 22, 2019

(65) Prior Publication Data
US 2019/0228725 A1 Jul. 25, 2019

(30) Foreign Application Priority Data
Jan. 23, 2018 (JP) .............................. JP2018-008553

(51) Int. Cl.
*G09G 3/36* (2006.01)
*G09G 3/20* (2006.01)
*G09G 3/3258* (2016.01)
*G02F 1/133* (2006.01)

(52) U.S. Cl.
CPC ....... *G09G 3/3622* (2013.01); *G02F 1/13306* (2013.01); *G09G 3/2092* (2013.01); *G09G 3/3258* (2013.01); *G09G 2310/0251* (2013.01); *G09G 2310/0291* (2013.01); *G09G 2310/0297* (2013.01)

(58) Field of Classification Search
None
See application file for complete search history.

(56) References Cited

U.S. PATENT DOCUMENTS

| 5,959,600 | A | 9/1999 | Uchino et al. | |
|---|---|---|---|---|
| 2004/0012553 | A1 | 1/2004 | Lee et al. | |
| 2005/0052890 | A1* | 3/2005 | Morita | G09G 3/3688 365/87 |
| 2006/0227638 | A1* | 10/2006 | Kudo | G09G 3/20 365/203 |
| 2012/0038692 | A1* | 2/2012 | Ito | G09G 3/36 345/691 |
| 2013/0300722 | A1* | 11/2013 | Gyouten | G09G 3/3648 345/204 |

FOREIGN PATENT DOCUMENTS

| JP | H08-286639 | A | 11/1996 |
|---|---|---|---|
| JP | 2004-54292 | A | 2/2004 |
| JP | 2012-037827 | A | 2/2012 |
| JP | 5552954 | B2 | 7/2014 |
| JP | 2015-087586 | A | 5/2015 |

* cited by examiner

*Primary Examiner* — Stephen T. Reed
(74) *Attorney, Agent, or Firm* — Oliff PLC

(57) ABSTRACT

A display driver includes an amplifier circuit configured to output time-sequentially arrayed first to n-th data voltages to an image-signal input terminal, and a switch-control-signal output circuit configured to output switch control signals that control the first to n-th switches disposed between the image-signal input terminal and respective first to n-th data lines. The switch-control-signal output circuit outputs the switch control signals that turn on two or more switches including a p-th switch (where p is an integer within the range of 2 to n, inclusive) among the first to n-th switches during a first driving period. The amplifier circuit outputs a p-th data voltage among the first to n-th data voltages during the first driving period.

12 Claims, 7 Drawing Sheets

DISPLAY DRIVER, ELECTROOPTIC DEVICE, AND ELECTRONIC APPARATUS

BACKGROUND

1. Technical Field

The present invention relates to a display driver, an electrooptic device, and an electronic apparatus.

2. Related Art

For an electrooptic apparatus, such as a liquid crystal display, there is known a pre-charge method of applying a predetermined pre-charge voltage to pixels before writing data voltage in the pixels. Pre-charge is carried out with the aim of, for example, writing assistance of a data voltage. In writing assistance of a data voltage, a pre-charge voltage similar to the data voltage scheduled to be written in a pixel is preliminarily applied to the pixel, to suppress insufficient writing of the data voltage (the difference between the actual voltage written in the pixel and the data voltage).

As a known pre-charge technique, a technique is disclosed in, for example, JP-A-2012-37827. In JP-A-2012-37827, during a pre-charge period before writing a data voltage (image signal) in k pixels, an amplifier circuit applies a predetermined pre-charge to the k pixels under demultiplex driving of sequentially driving k pixels by the amplifier circuit in a horizontal scan period.

Nowadays, since there is an increasing trend in the number of pixels in an electrooptic panel and the frame rate of display, the driving time per pixel is becoming short. Thus, it is becoming difficult to write a data voltage in the pixels within the driving time. When the above-described pre-charge for writing assistance is to be carried out, writing can be started from a pre-charge voltage that has the same polarity as that of the data voltage to be written in the pixels, but the driving time per pixel is shortened by a length corresponding to the pre-charge period. Thus, when the number of pixels and the frame rate increase, it is possible that the driving time of the pixels may be insufficient.

SUMMARY

According to some aspects of the invention, a display driver, an electrooptic device, and an electronic apparatus can be provided that can carry out pre-charge for writing assistance and maintain a sufficient driving time per pixel.

An aspect of the invention relates to a display driver including an amplifier circuit configured to output time-divided first to n-th data voltages to an image-signal input terminal of an electro-optic panel during first to n-th driving periods (where n represents an integer of two or more) in a horizontal scanning period, and a switch-control-signal output circuit configured to output switch control signals for controlling first to n-th switches disposed between the image-signal input terminal of the electro-optic panel and respective first to n-th data lines, wherein the switch control signal output circuit outputs the switch control signals that turn on two or more of the switches including the first switch disposed between the image-signal input terminal and the first data line, among the first to n-th switches, during the first driving period among the first to n-th driving periods, and the amplifier circuit outputs the first data voltage to be fed to the first data line, among the first to n-th data voltages, during the first driving period.

According to an aspect of the invention, first to n-th pixels connected to the first to n-th data lines, respectively, are driven by time division during the horizontal scanning period, and, two or more of the switches including the first switch are turned on and the amplifier circuit outputs the first data voltage during the first driving period, which is a driving period of a pixel driven first among the first to n-th pixels. In this way, the first driving period can also be used a pre-charge period, and thus, there is no need to provide a pre-charge period separately from the driving period for driving the pixels. In this way, the driving period per pixel can be extended in comparison to when a pre-charge period is provided separately from the driving period for driving pixels, and higher resolution of the electro-optic panel and an increased frame rate of the display can be readily supported.

Furthermore, according to an aspect of the invention, the switch control signal output circuit may output the switch control signals for turning on two or more switches including a p-th switch (where p represents an integer within the range of 2 to n, inclusive) different from the first switch among the first to n-th switches during the first driving period in a horizontal scanning period subsequent to the previous horizontal scanning period, and the amplifier circuit may output a p-th data voltage among the first to n-th data voltages during the first driving period.

According to an aspect of the invention, when rotation of the driving order of demultiplex driving is carried out, a pre-charge operation corresponding to the driving order can be carried out. That is, during the first driving period in the horizontal scanning period during which the pixel of the first driving order is driven, a data voltage can be written in the pixel while one or more pixels (and data lines connected to the pixels) can be pre-charged with the data voltage.

Furthermore, according to an aspect of the invention, the switch control signal output circuit may output the switch control signals for turning on the first to n-th switches during the first driving period and the switch control signals for turning on an i-th switch (where i represents an integer within the range of 2 to n, inclusive) among the first to n-th switches while turning off the switches other than the i-th switch, during an i-th driving period among the first to n-th driving periods.

According to an aspect of the invention, during the first driving period, the first data voltage can be written in the first pixel connected to the first data line and also the second to n-th pixels connected to the second to n-th data lines, respectively, can be pre-charged. Since the first driving period is also used as the pre-charge period, the time approximately equal to a driving period of one pixel can be distributed among the second to n-th driving periods for driving the second to n-th pixels, respectively.

Furthermore, according to an aspect of the invention, a length of the first driving period may be larger than a length of the i-th driving period.

Since the first to n-th switches are turned on, and the first to n-th pixels and the first to n-th data lines are connected to the image-signal input terminal, during the first driving period, the load on the amplifier circuit increases in comparison to that during the second to n-th driving periods. According to an aspect of the invention, by extending the length of the first driving period in comparison to the length of the second to the n-th driving periods, the first data voltage can be accurately written in the first pixel while the pre-charge periods of the second to n-th pixels can be provided during the first driving period.

Furthermore, according to an aspect of the invention, the switch control signal output circuit may output the switch control signals for turning on the first to k-th switch (where k represents an integer within the range of 2 to n−2, inclusive) among the first to n-th switches during the first driving period and the switch control signals for turning on a (k+1)th to q-th switches (where q represents an integer within the range of k+2 to n, inclusive) among the first to n-th switches during a (k+1)th driving period among the first to n-th driving periods, and the amplifier circuit may output a (k+1)th data voltage among the first to n-th data voltages during the (k+1)th driving period.

According to an aspect of the invention, the first to n-th pixels driven in a horizontal scanning period are divided into multiple groups, and each group can be pre-charged. That is, in each group, pixels in the groups can be pre-charged with the data voltage of the pixel driven first in the group. In this way, since the load on the amplifier circuit during pre-charge is reduced, the differences in the data voltages written in the pixels during the driving period also used as the pre-charge period can be reduced. Otherwise, the length of the driving period also used as the pre-charge period can be reduced in comparison to the length of the first driving period in which all of the first to n-th pixels are pre-charged at once.

Furthermore, according to an aspect of the invention, the switch-control-signal output circuit may output the switch control signals for turning on an r-th and (r+1)th switches (where r represents an integer within the range of 1 to n−1, inclusive) among the first to n-th switches during an r-th driving period among the first to n-th driving periods, and the amplifier circuit may output an r-th data voltage among the first to n-th data voltages during the r-th driving period.

According to an aspect of the invention, while writing the r-th data voltage in the r-th pixel, the (r+1)th pixel can be pre-charged with the r-th data voltage. Since the polarities of the data voltages in the same horizontal scanning period are the same, the (r+1)th pixel can be pre-charged with the r-th data voltage having the same polarity as that of the (r+1)th data voltage, and writing assistance can be carried out for the (r+1)th pixel. Furthermore, since the amplifier circuit drives two pixels each, the fluctuation in the load of the amplifier circuit during writing of the data voltage to each pixel can be decreased.

Furthermore, according to an aspect of the invention, the display driver may include a D/A converter circuit configured to D/A-convert the first to n-th display data and output time-divided first to n-th D/A converted voltages, and the amplifier circuit may output the first to n-th data voltages corresponding to the time-divided first to n-th D/A converted voltage during the first to n-th driving periods, respectively.

According to an aspect of the invention, the D/A converter circuit outputs the time-divided first to n-th D/A converted voltages, and the amplifier circuit outputs the first to n-th data voltages during the time-divided first to n-th driving periods, respectively. Furthermore, according to an aspect of the invention, the switch control signals for turning on the first to n-th switches are output during the first driving period, and the switch control signals for sequentially turning on the second to n-th switches are output during the second to n-th driving periods, respectively. In this way, demultiplex driving for time-divided driving of the first to n-th pixels and the first to n-th data lines is achieved.

Furthermore, according to another aspect of the invention, the amplifier circuit may output the first to n-th data voltages having a positive or negative polarity in the horizontal scanning period and output the first to n-th data voltages having the other one of the positive and negative polarities in the horizontal scanning period one frame after the previous horizontal scanning period.

When such polarity inverting driving is carried out, it is necessary to charge the pixel capacitance already charged with a data voltage having a negative polarity with a data voltage having a positive polarity or charge the pixel capacitance already charged with a data voltage having a positive polarity with a data voltage having a negative polarity. Thus, it is possible that the writing time of the pixels may be extended or the differences in the data voltages written in the pixels may be large. At this time, writing assistance can be carried out by pre-charging the pixels with a pre-charge voltage having the same polarity as that of the data voltage driving the pixels. However, when a pre-charge period is provided separately from the driving period of the pixels, there is a problem in that the driving period per pixel becomes short. In an aspect of the invention, by carrying out pre-charge with the data voltage written in the first pixel in the horizontal scanning period, writing assistance can be carried out without shortening of the driving time per pixel.

Another aspect of the invention relates to an electro-optic apparatus including the display driver described in any one of the aspects above and the electro-optic panel driven by the display driver.

Further, still another aspect of the invention is related to an electronic apparatus including the display driver described in any one of the descriptions above.

BRIEF DESCRIPTION OF THE DRAWINGS

The invention will be described with reference to the accompanying drawings, wherein like numbers reference like elements.

DESCRIPTION OF EXEMPLARY EMBODIMENTS

Exemplary embodiments of the invention will be described in detail hereinafter. Note that the exemplary embodiments described hereinafter are not intended to limit the content of the invention as set forth in the claims, and not all of the configurations described in the exemplary embodiments are absolutely required to address the issues described in the invention.

1. Display Driver, Electrooptic Panel

Figure 1:
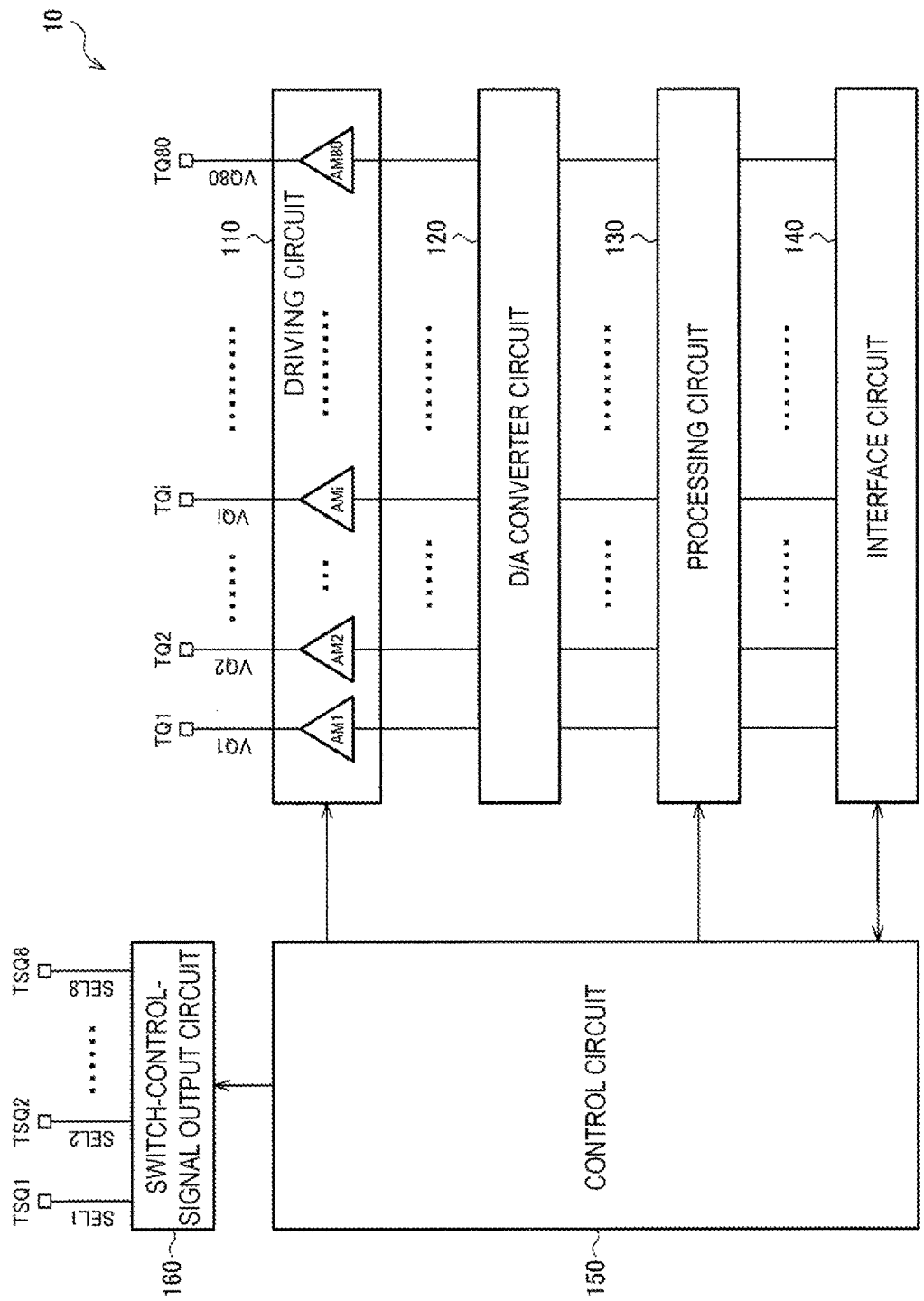
FIG. 1 illustrates an example configuration of a display driver.

FIG. 1 illustrates an example configuration of a display driver 10. The display driver 10 includes a driving circuit 110 and a switch-control-signal output circuit 160. Furthermore, the display driver 10 may include a D/A converter circuit 120, a processing circuit 130, an interface circuit 140, a control circuit 150, image-signal output terminals TQ1 to TQ80, and switch-control-signal output terminals TSQ1 to TSQ8.

The interface circuit 140 establishes communication between an external processing device of the display driver 10 and the display driver 10. The processing device is, for example, a CPU, a MPU, or a display controller. The interface circuit 140 receives display data (image data, tone data) sent by the processing device, receives setting data sent by the processing device, and sends various data items to the processing device. The setting data is, for example, register setting values and commands. The data sent to the processing device is, for example, register readout data. As the communication scheme of the interface circuit 140, for example, a serial peripheral interface (SPI) scheme, an inter-integrated circuit (I2C) scheme, a low voltage differential signaling (LVDS) scheme, or an RGB serial interface scheme can be used.

The processing circuit 130 carries out data processing on the display data received by the interface circuit 140 and outputs the processed display data to the D/A converter circuit 120. For example, the processing circuit 130 carries out multiplex processing on the display data. That is, the processing circuit 130 latches the display data of one line and outputs time-divided display data items of the pixels corresponding to the multiplex number during one horizontal scan period. In other words, display data items of the pixels corresponding to the multiplex number are temporally arrayed and output in one horizontal scan period. In FIG. 1, the number of pixels driven by one amplifying circuit in one horizontal scan period (hereinafter, referred to as multiplex number) is eight. The multiplexing number, however, is not limited to eight. Alternatively, the processing circuit 130 may carry out gamma correction processing, white-balance correction processing, or FRC processing on the display data. The processing circuit 130 includes, for example, a line latch or a multiplexer. Alternatively, the processing circuit 130 may include a logic circuit (gate array) including automatic placement lines.

The D/A converter circuit 120 D/A-converts the time-divided display data of pixels output by the processing circuit 130 and outputs time-divided tone voltages corresponding to the time-divided display data of the pixels. The D/A converter circuit 120 includes a voltage generator circuit that generates multiple voltages and a voltage selector circuit that selects a voltage corresponding to the display data of the pixels among the multiple voltages. The voltage generator circuit is, for example, a ladder resistor circuit, and the voltage generator circuit is, for example, a selector including switches.

The driving circuit 110 amplifies (or buffers) the time-divided tone voltages from the D/A converter circuit 120 and outputs data voltages that are the amplified tone voltages as voltages VQ1 to VQ80. In detail, the driving circuit 110 includes amplifier circuits AM1 to AM80, where an amplifier circuit AMi outputs a voltage VQi. Here, "i" represents an integer within the range of 1 to 80, inclusive. A voltage VQi is output from an image-signal output terminal TQi to an image-signal input terminal (TIi in FIG. 2) of an electrooptic panel. Furthermore, the amplifier circuit AMi precharges the pixels and data lines of the electrooptic panel with a data voltage of the first pixel subjected to the demultiplex driving during the driving period of this pixel. Details of the pre-charge will be described below. The amplifier circuit AMi is, for example, a voltage follower circuit. In such a case, the amplifier circuit AMi includes an operating amplifier in which the output node and the inverting input node (negative polarity input node) of the operating amplifier are connected, and the non-inverting input node (positive polarity input node) of the operating amplifier receives a tone voltage. Alternatively, the amplifier circuit AMi may be an inverting amplifier circuit. In such a case, the amplifier circuit AMi includes an operating amplifier, a resistor disposed between the node receiving the tone voltage and the non-inverting input node of the operating amplifier, and a resistor connected to both the output node and the inverting input node of the operating amplifier.

The control circuit 150 carries out various control processes for the components of the display driver 10. In detail, the control circuit 150 carries out timing control of the driving of the electrooptic panel on the basis of the display data and timing control signals received via the interface circuit 140. Furthermore, the control circuit 150 carries out operation setting, and the like of components of the display driver 10 on the basis of setting information and commands received via the interface circuit 140. For example, the control circuit 150 controls the timing of multiplex processing of the display data by the processing circuit 130 and the timing of output of switch control signals SEL1 to SEL8 by the switch-control-signal output circuit 160.

The switch-control-signal output circuit 160 outputs the switch control signals SEL1 to SEL8 that control the on/off of the switches (SD1 to SD8 in FIG. 2) of the demultiplexer of the electrooptic panel. All of the switch control signals SEL1 to SEL8 are active during the driving period of the first pixel of the demultiplex driving. The term "active" refers to a logic level (first logic level) turning on a switch. A switch control signal SELs is output from a switch-control-signals output terminal TSQs to an image-signal input terminal (TSIs in FIG. 2) of the electrooptic panel. Here, "s" represents an integer within the range of 1 to 8, inclusive.

Figure 2:
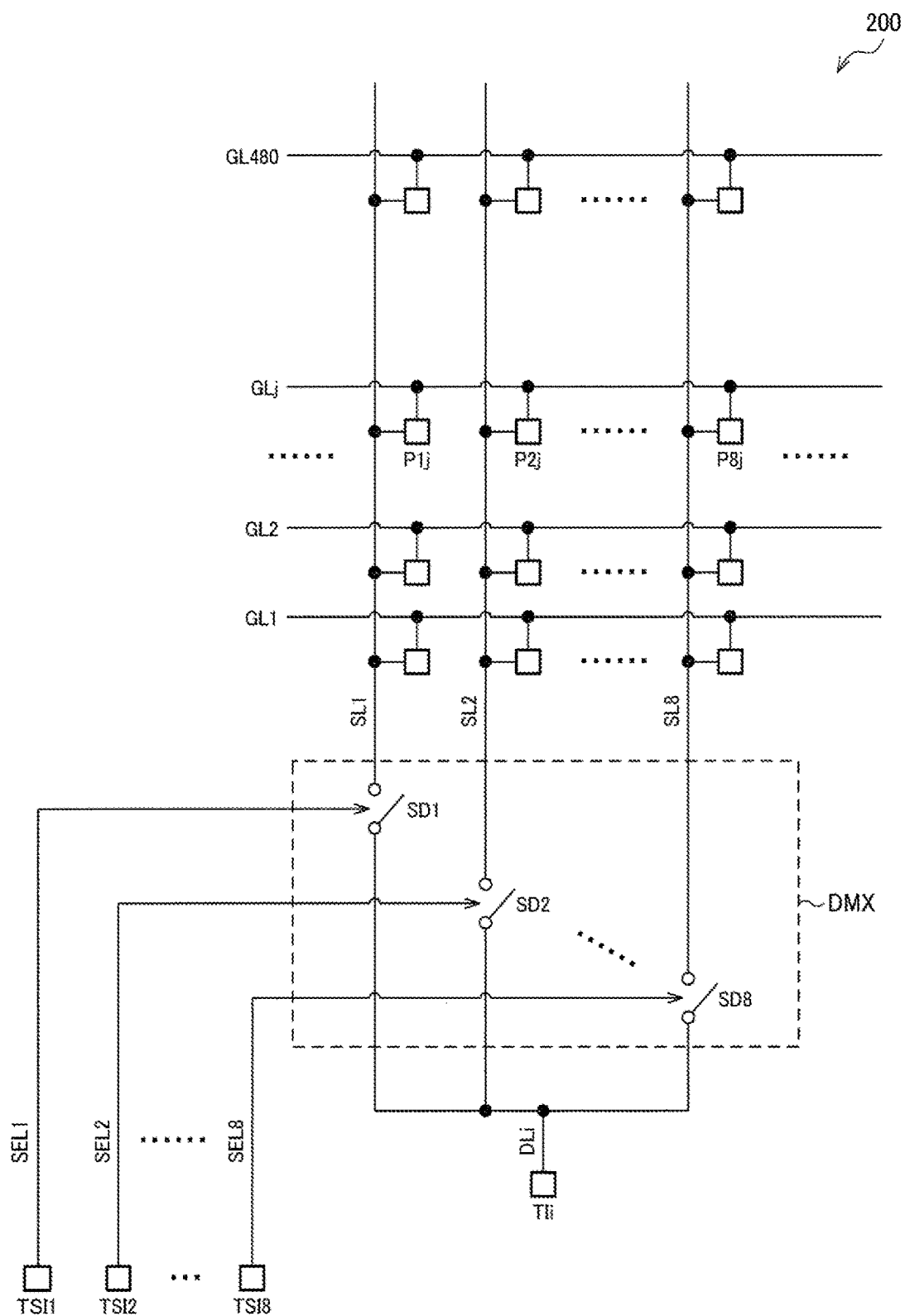
FIG. 2 illustrates an example configuration of an electrooptic panel.

FIG. 2 illustrates an example configuration of an electrooptic panel 200 driven by the display driver 10. In FIG. 1, among the 640×480 pixel array, only a portion relevant to the image-signal input terminal TIi connected to the image-signal output terminals TQi of the display driver 10 is illustrated. It should be noted that the size of the pixel array is not limited to 640×480.

The electrooptic panel 200 includes an image signal line DLi, data lines SL1 to SL8 (signal lines), a demultiplexer DMX, scanning lines GL1 to GL480, and 8×480 pixels (image circuits).

The demultiplexer DMX includes switches SD1 to SD8. The switch SD1 is disposed between the image signal line DLi and the data line SL1. Similarly, the switches SD2 to SD8 are disposed between the image signal line DLi and the data lines SL2 to SL8, respectively. The switches SD1 to SD8 are transistors, such as thin film transistors (TFT). Taking a scanning line GLj as an example, the pixel P1j is connected to the scanning line GLj and the data line SL1. Here, "j" represents an integer within the range of 1 to 480, inclusive. Similarly, the pixels P2j to P8j are connected to the scanning line GLj and the data lines SL2 to SL8, respectively. Each pixel includes, for example, a liquid crystal cell (pixel) and a TFT (transistor). The source of the TFT is connected to the data line, the drain is connected to the liquid crystal cell, and the gate is connected to the scanning line.

2. Pre-Charge Operation

The pre-charge and demultiplex driving of the display driver 10 and the electrooptic panel 200 will now be described with reference to FIGS. 1 and 2 as examples.

Figure 3:
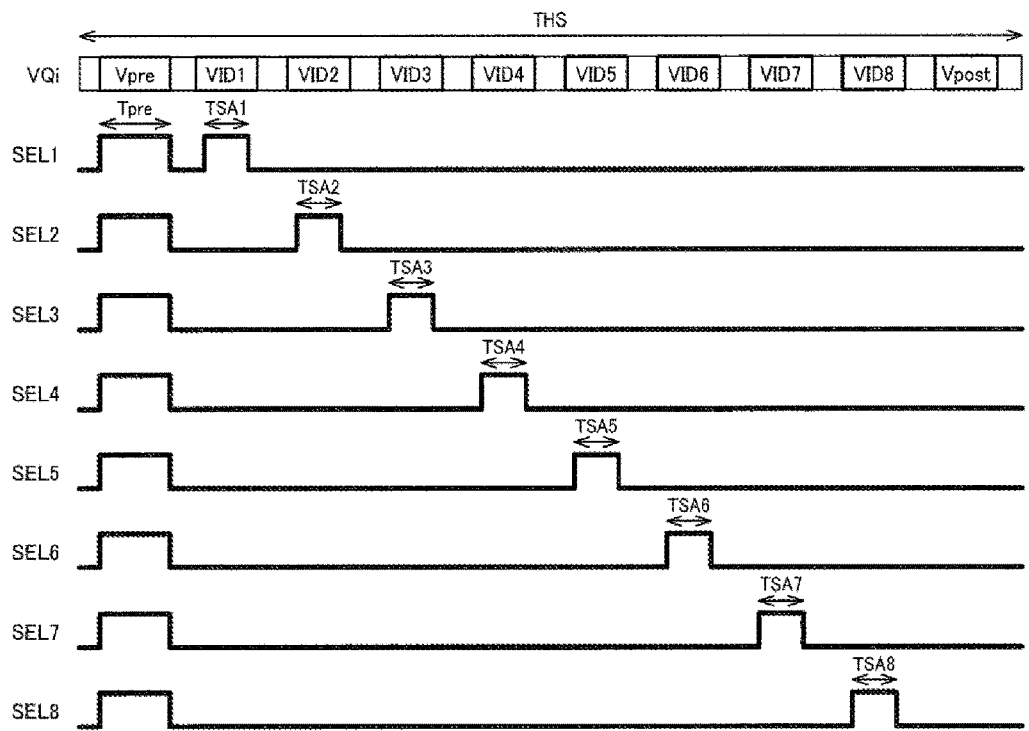
FIG. 3 illustrates a timing chart depicting a known technique of pre-charge and demultiplex driving.

FIG. 3 illustrates a timing chart depicting a known technique of pre-charge and demultiplex driving.

In the known technique, pixels are pre-charged and then data voltages are written in the pixels, in the horizontal scanning period THS. In detail, the switch-control-signal output circuit 160 outputs active switch control signals SEL1 to SEL8 and the amplifier circuit AMi outputs a pre-charge voltage Vpre, during the pre-charge period Tpre. When the pixels P1j to P8j are selected in the horizontal scanning period THS, the pixels P1j to P8j and the data lines SL1 to SL8 are charged (pre-charged) with the pre-charge voltage Vpre. It should be noted that, FIG. 3 illustrates voltages VQi output from the amplifier circuit AMi as an example. However, the amplifier circuits AM1 to AM80 output the same pre-charge voltage Vpre during the pre-charge period Tpre. During polarity inverting driving in which pixels alternately driven with a data voltage having a positive polarity and a data voltage having a negative polarity (for example, alternating between frames), the pre-charge voltage Vpre is a voltage having the same polarity as that of the data voltage driving the pixels (hereinafter, referred to as pre-charge voltage for writing assistance).

After the pre-charge period Tpre, the switch-control-signal output circuit 160 outputs an active switch control signal SEL1, and the amplifier circuits AMi outputs a data voltage VID1, during the driving period TSA1. The data voltage VID1 is a voltage of an image signal corresponding to the display data of the pixel P1j. The switch control signals SEL2 to SEL8 are inactive during the driving period TSA1. The term "inactive" refers to a logic level (second logic level) turning off a switch. Similarly, the switch-control-signal output circuit 160 outputs active switch control signals SEL2 to SEL8, and the amplifier circuits AMi outputs data voltages VID2 to VID8, during the driving periods TSA2 to TSA8, respectively.

After the driving periods TSA1 to TSA8, the switch-control-signal output circuit 160 outputs inactive switch control signals SEL1 to SEL8, and the amplifier circuits AMi outputs a post-charge voltage Vpost, during the post-charge period. Under demultiplex driving, it is possible that the voltages of the data lines of the turned-off switches SD1 to SD8 may fluctuate due to capacitive coupling between the image signal line DLi and the data lines. Post-charge suppresses a reduction in image quality due to such voltage fluctuation.

As described above, with a known pre-charge technique, a pre-charge period Tpre is provided separately from the driving periods TSA1 to TSA8 of the pixels, and the amplifier circuits AM1 to AM80 pre-charge the data lines and the pixels with a common pre-charge voltage Vpre. Thus, the time that can be used for driving of the pixels is reduced by the pre-charge period Tpre and the period between the pre-charge period Tpre and the driving period TSA1 (the period during which the switches SD1 to SD8 are turned off). For example, a projector of a relatively high performance type drives 2160 scanning lines at 120 frames per second (fps). At this time, the pre-charge period for writing assistance is, for example, 200 ns, and the driving period of one pixel is approximately 110 ns. In the case where the multiplex number is eight, 200 ns/8=25 ns, and thus the driving period of one pixel is reduced by 25 ns because a pre-charge period is provided.

Figure 4:
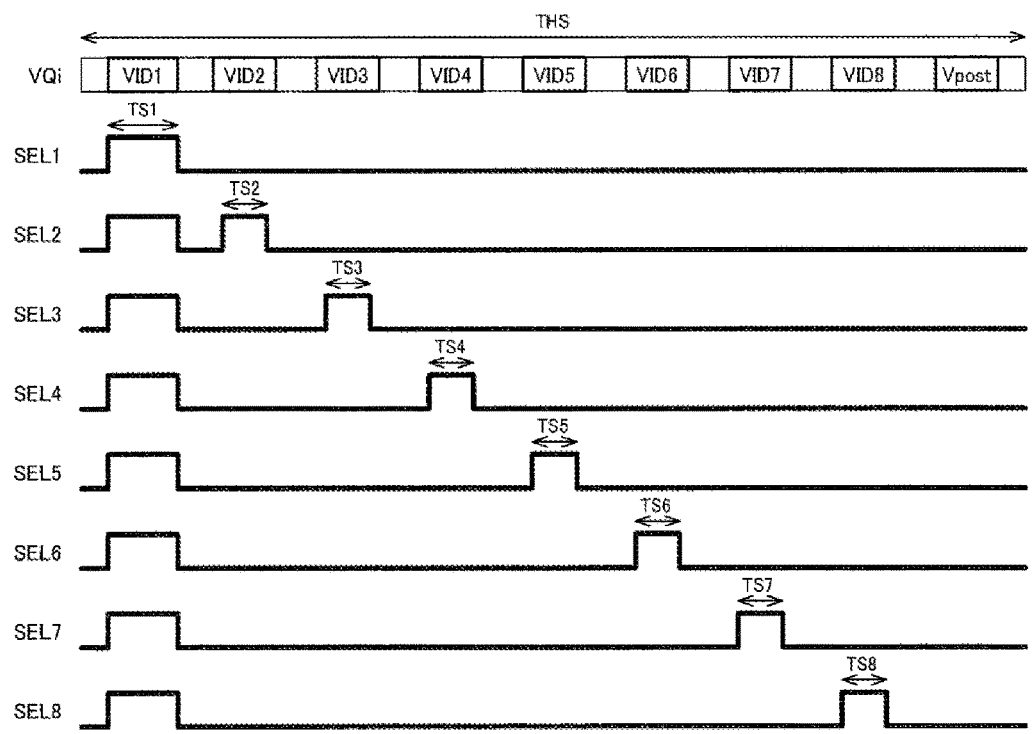
FIG. 4 illustrates a timing chart depicting pre-charge and demultiplex driving according to an exemplary embodiment.

FIG. 4 illustrates a timing chart depicting pre-charge and demultiplex driving according to an exemplary embodiment.

In this exemplary embodiment, a pre-charge period is not provided in the horizontal scanning period THS, and pre-charge and writing in the first pixel are carried out during the driving period TS1 of the first pixel. In detail, the switch-control-signal output circuit 160 outputs active switch control signals SEL1 to SEL8, and the amplifier circuits AMi outputs a data voltage VID1, during the driving period TS1. When the pixels P1j to P8j are selected in the horizontal scanning period THS, the pixels P1j to P8j and the data lines SL1 to SL8 are charged with the data voltage VID1. The charging of the pixel P1j is writing of a data voltage, and the charging of the pixels P2j to P8j is pre-charge. Under polarity inverting driving, data voltages having the same polarity are written in the pixels P1j to P8j. That is, the pixels P2j to P8j are pre-charged with the data voltage VID1 having the same polarity as that of data voltages VID2 to VID8, and thus the data voltage VID1 is equivalent to a pre-charge voltage for writing assistance.

During the driving period TS2, the switch-control-signal output circuit 160 outputs an active switch control signal SEL2, and the amplifier circuit AMi outputs the data voltage VID2. The switch control signals SEL1 and SEL3 to SEL8 are inactive during the driving period TS2. Similarly, during the respective driving periods TSA3 to TSA8, the switch-control-signal output circuit 160 outputs active switch control signals SEL3 to SEL8, and the amplifier circuit AMi outputs the data voltages VID3 to VID8. After the driving periods TSA1 to TSA8, the switch-control-signal output circuit 160 outputs inactive switch control signals SEL1 to SEL8, and the amplifier circuit AMi outputs a post-charge voltage Vpost, during a post-charge period. It should be noted that the post-charge may be omitted.

In the exemplary embodiment described above, the amplifier circuit AMi outputs the time-divided data voltages VID1 to VID8 to the image-signal input terminal TIi of the electrooptic panel 200 during the driving periods TS1 to TS8 in the horizontal scanning period THS. The switch-control-signal output circuit 160 outputs the switch control signals SEL1 to SEL8 that control the respective switches SD1 to SD8 disposed between the image-signal input terminal TIi and the respective data lines SL1 to SL8 of the electrooptic panel 200. Furthermore, the switch-control-signal output circuit 160 outputs switch control signals SEL1 to SEL8 that turn on two or more switches including the switch SD1 (first switch) disposed between the image-signal input terminal TIi and the data line SL1, during the driving period TS1. The amplifier circuit AMi outputs the data voltage VID1 during the driving period TS1. The data voltage VID1 is the data voltage suppled to the data line SL1.

According to this exemplary embodiment, the pixels P1j to P8j connected to the respective data lines SL1 to SL8 are driven by time division in the horizontal scanning period THS, and, two or more switches including the switch SD1 are turned on and the amplifier circuit AMi outputs the data voltage VID1 during the driving period TS1, which is the driving period of the pixel driven first among the pixels P1j to P8j. In this way, the driving period TS1 can also be used a pre-charge period, and thus, there is no need to provide a pre-charge period separately from the driving period. In detail, during the driving period TS1, the data voltage VID1 can be written in the pixel P1j while one or more pixels (and the data lines connected to the pixels) can be pre-charged with the data voltage VID1. For example in FIG. 4, during the driving period TS1, the switches SD1 to SD8 are turned on, and the data voltage VID1 can be written in the pixel P1j while the pixels P2j to P8j can be pre-charged. By using the driving period TS1 also as the pre-charge period, the driving period of one pixel is omitted, and thus the driving period per pixel can be extended. In this way, higher resolution of the electrooptic panel and an increased frame rate of the display can be readily supported.

It should be noted that all of the switches SD1 to SD8 of the demultiplexer DMX are turned on during the driving period TS1 in FIG. 4. However, the number of switches to be turned on is not limited as long as two or more switches including the switch turned on during the first driving period in the horizontal scanning period THS are turned on.

Furthermore, in FIG. 4, the amplifier circuit AMi outputs the data voltage VID1 during the entire driving period TS1. The output timing, however, is not limited as long as the amplifier circuit AMi outputs the data voltage VID1 at the timing at which the switch control signal SEL1 changes from an active state to an inactive state.

In the above, an example in which the multiplex number is eight is described. Alternatively, the multiple number may be n. That is, during the first to n-th driving periods (where n is an integer of two or greater) in the horizontal scanning period THS, the amplifier circuit AMi should output time-divided first to n-th data voltages.

Furthermore, the switch-control-signal output circuit 160 should output switch control signals that control the first to n-th switches disposed between the image-signal input terminal TIi and the first to n-th data lines, respectively.

Furthermore, according to this exemplary embodiment, the switch-control-signal output circuit 160 outputs the switch control signals SEL1 to SEL8 that turn on the switches SD1 to SD8, respectively, during the driving period TS1. The switch-control-signal output circuit 160 outputs the switch control signals SEL1 to SEL8 that turn on a switch SDi while turning off the switches other than the switch SDi during a driving period TSi (i-th driving period (where i represents an integer within the range of 2 to n, inclusive).

In this way, during the driving period TS1, the data voltage VID1 can be written in the pixel P1j, while the pixels P2j to P8j can be pre-charged. As in the example described above, in the case where the driving period of one pixel is approximately 110 ns, the omitted 110 ns is distributed among the driving periods of the remaining seven pixels, and thus, the driving period can be extended by 110 ns/7≠16 ns per pixel. Sixteen ns is equivalent to approximately 1 τ, where i is the time constant of the driving and 110 ns=6 τ. That is, the driving period is extended by 1 τ, and higher resolution of the electrooptic panel and an increased frame rate of the display can be readily supported.

It should be noted that the term "the switches other than the switch SDi" refers to the switches other the i-th switch among the first to n-th switches or to the first to the (i−1)th switches and the i-th to n-th switches.

Furthermore, according to this exemplary embodiment, the length of the driving period TS1 is larger than the length of the driving period TSi (i.e., any one of TS2 to TS8), as illustrated in FIG. 4.

Since the switches SD1 to SD8 are turned on, and the pixels P1j to P8j and the data lines SL1 to SL8 are connected to the image-signal input terminal TIi, during the driving period TS1, the load on the amplifier circuit AMi increases in comparison to that during the driving periods TS2 to TS8. According to this exemplary embodiment, by extending the driving period TS1 in comparison to the driving periods TS2 to TS8, the data voltage VID1 can be accurately written in the pixel P1j while the periods for pre-charge of the pixels P2j to P8j can be provided during the driving period TS1. For example, the length of the driving period TS1 should be set to the same length (or substantially the same length) as the pre-charge period Tpre in FIG. 3.

Furthermore, in this exemplary embodiment, the D/A converter circuit 120 D/A-converts the first to eighth display data items (first to n-th display data items) and output the time-divided first to eighth D/A converted voltages (first to n-th D/A converted voltages). The amplifier circuit AMi then outputs the time-divided data voltages VID1 to VID8 (first to n-th data voltages) respectively corresponding to the first to eighth D/A converted voltages during the driving periods TS1 to TS8 (first to n-th driving periods), respectively.

For example, in the horizontal scanning period during which the pixels P1j to P8j in FIG. 2 are driven, the first to eighth display data items are display data items corresponding to the data voltages driving the pixels P1j to P8j.

According to this exemplary embodiment, the D/A converter circuit 120 outputs the time-divided first to eighth D/A converted voltages, and the amplifier circuit AMi outputs the time-divided data voltages VID1 to VID8 during the driving periods TS1 to TS8, respectively. Furthermore, according to this exemplary embodiment, the switch-control-signal output circuit 160 activates the switch control signals SEL1 to SEL8 during the driving period TS1 and sequentially activates the switch controls signals SEL2 to SEL8 during the driving periods TS2 to TS8, respectively. In this way, demultiplex driving for time-divided driving of the pixels P1j to P8j and the data lines SL1 to SL8 is achieved.

Furthermore, in this exemplary embodiment, the amplifier circuit AMi outputs data voltages VID1 to VID8 having a positive or negative polarity in the horizontal scanning period THS and outputs data voltages VID1 to VID8 having the other one of the positive and negative polarities in the horizontal scanning period one frame after the horizontal scanning period THS.

That is, when the amplifier circuit AMi outputs data voltages VID1 to VID8 having a positive polarity in the horizontal scanning period THS, the amplifier circuits AMi outputs data voltages VID1 to VID8 having a negative polarity in the horizontal scanning period one frame after the horizontal scanning period THS. In contrast, when the amplifier circuit AMi outputs data voltages VID1 to VID8 having a negative polarity in the horizontal scanning period THS, the amplifier circuit AMi outputs data voltages VID1 to VID8 having a positive polarity in the horizontal scanning period one frame after the horizontal scanning period THS.

When such polarity inverting driving is carried out, it is necessary to charge the pixel capacitance already charged with a data voltage having a negative polarity with a data voltage having a positive polarity or charge the pixel capacitance already charged with a data voltage having a positive polarity with a data voltage having a negative polarity. Thus, it is possible that the writing time of the pixels may be extended or the differences in the data voltages written in the pixels may be large. In such a case, as described with reference to FIG. 3, writing assistance can be carried out by pre-charging the pixels with a pre-charge voltage having the same polarity as that of the data voltage driving the pixels. That is, the writing time can be shortened or the differences in the data voltages written in the pixels can be reduced. However, when a pre-charge period is provided separately from the driving period of the pixels, there is a problem in that the driving period per pixel becomes short. In this exemplary embodiment, pre-charge is carried out with the data voltage written in the first pixel in the horizontal scanning period, to enable writing assistance without shortening of the driving time per pixel.

It should be noted that a data voltage having a positive polarity is a data voltage having a voltage higher than a common voltage, and a data voltage having a negative polarity is a data voltage having a voltage lower than a common voltage. Furthermore, when a scanning line GLj is driven in a horizontal scanning period of a frame, "a horizontal scanning period after one frame" refers to the horizontal scanning period during which the scanning line GLj in the subsequent frame is driven.

3. Examples of Various Pre-Charge Operations

Figure 5:
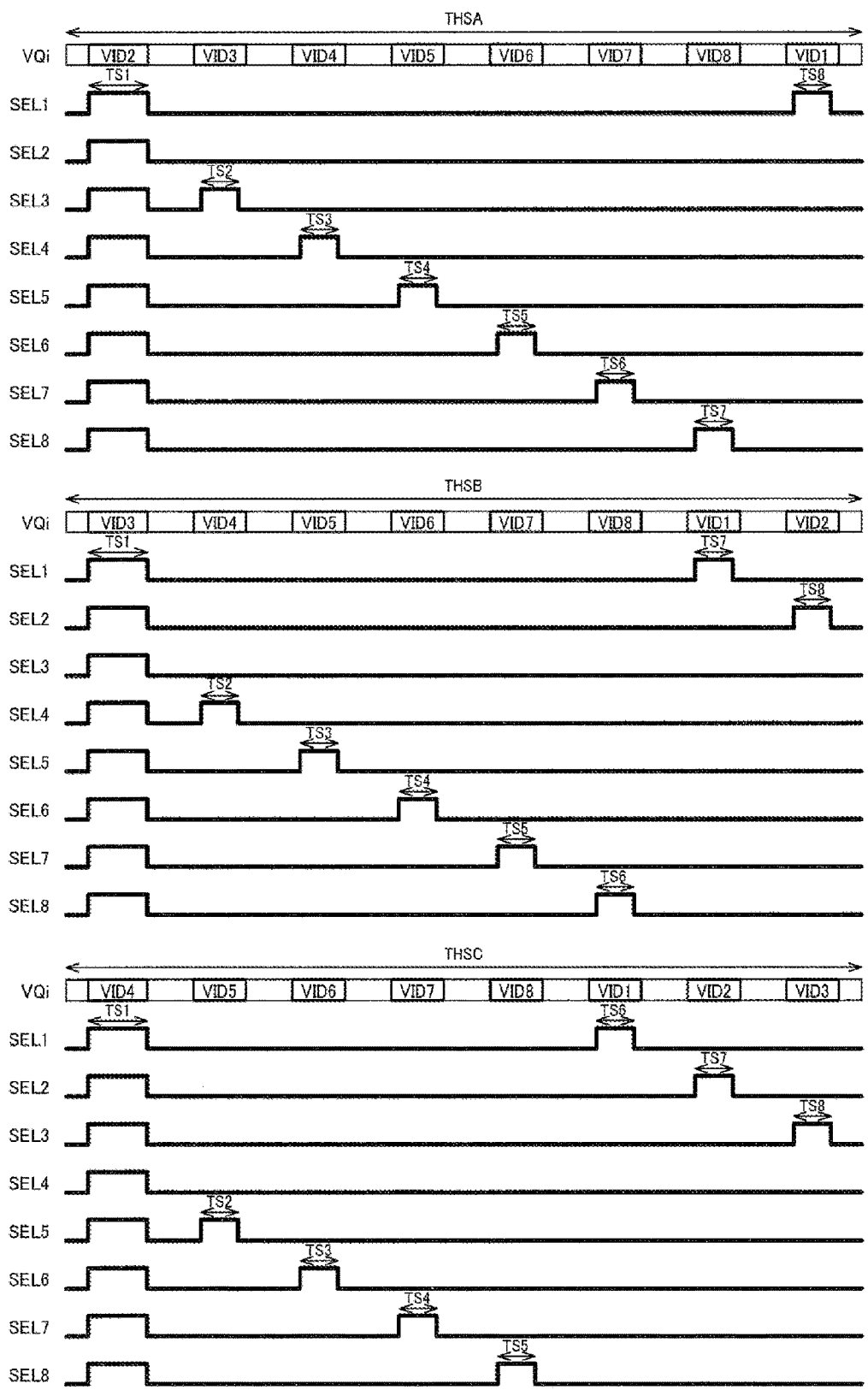
FIG. 5 illustrates a first timing chart depicting an operation performed when rotation of the driving order of the demultiplex driving is carried out.

FIG. 5 illustrates a first timing chart depicting an operation performed when rotation of the driving order of the demultiplex driving is carried out.

In FIG. 5, during the driving period TS1 in the horizontal scanning period THSA, the switch-control-signal output circuit 160 outputs active switch control signals SEL1 to SEL8, and the amplifier circuit AMi outputs a data voltage VID2. During the driving period TS2, the switch-control-signal output circuit 160 outputs an active switch control signal SEL3, and the amplifier circuit AMi outputs a data voltage VID3. The switch control signals SEL1, SEL2, and SEL4 to SEL8 are inactive during the driving period TS2. Similarly, during the respective driving periods TS3, TS4, TS5, TS6, TS7, and TS8, the switch-control-signal output circuit 160 outputs active switch control signals SEL4, SEL5, SEL6, SEL7, SEL8, and SEL1, and the amplifier circuit AMi outputs data voltages VID4, VID5, VID6, VID7, VID8, and VID1.

In the horizontal scanning period THSB subsequent to the horizontal scanning period THSA, the switch-control-signal output circuit 160 outputs active switch control signals SEL1 to SEL8, and the amplifier circuit AMi outputs a data voltage VID3, during the driving period TS1. During the respective driving periods TS2, TS3, TS4, TS5, TS6, TS7, and TS8, the switch-control-signal output circuit 160 outputs active switch control signals SEL4, SEL5, SEL6, SEL7, SEL8, SEL1, and SEL2, and the amplifier circuit AMi outputs data voltages VID4, VID5, VID6, VID7, VID8, VID1, and VID2.

In the horizontal scanning period THSC subsequent to the horizontal scanning period THSB, the switch-control-signal output circuit 160 outputs active switch control signals SEL1 to SEL8, and the amplifier circuit AMi outputs a data voltage VID4, during the driving period TS1. During the respective driving periods TS2, TS3, TS4, TS5, TS6, TS7, and TS8, the switch-control-signal output circuit 160 outputs active switch control signals SEL5, SEL6, SEL7, SEL8, SEL1, SEL2, and SEL3, and the amplifier circuit AMi outputs data voltages VID5, VID6, VID7, VID8, VID1, VID2, and VID3.

Following this, similarly, the first pixel driven in the horizontal scanning period is shifted by one for each frame, and a cycle is completed in eight frames. It should be noted that, in the horizontal scanning period before the horizontal scanning period THSA, the switch-control-signal output circuit 160 outputs active switch control signals SEL1 to SEL8, and the amplifier circuit AMi outputs a data voltage VID1, during the first driving period TS1 in the horizontal scanning period, as in FIG. 4.

In the example in FIG. 5, the basic driving order of the pixels is P1j, P2j, P3j, P4j, P5j, P6j, P7j, and P8j, and the first pixel driven in the horizontal scanning period is rotated. Then, pre-charge is carried out with the data voltage of the first pixel driven in the rotation.

Figure 6:
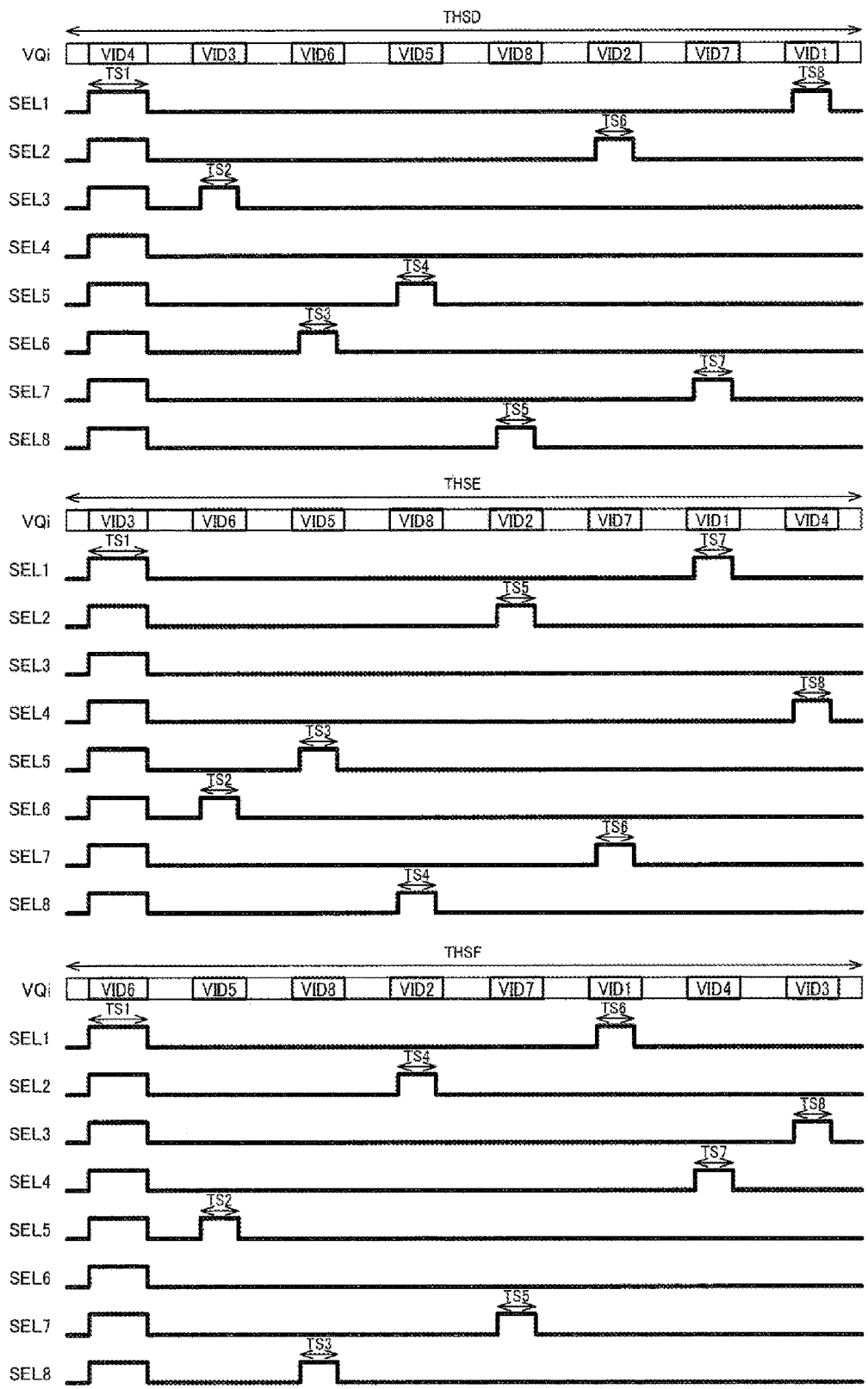
FIG. 6 illustrates a second timing chart depicting an operation performed when rotation of the driving order of the demultiplex driving is carried out.

FIG. 6 illustrates a second timing chart depicting an operation performed when rotation of the driving order of the demultiplex driving is carried out.

In FIG. 6, during the driving period TS1 in the horizontal scanning period THSD, the switch-control-signal output circuit 160 outputs active switch control signals SEL1 to SEL8, and the amplifier circuit AMi outputs a data voltage VID4. During the driving period TS2, the switch-control-signal output circuit 160 outputs an active switch control signal SEL3, and the amplifier circuit AMi outputs a data voltage VID3. The switch control signals SEL1, SEL2, and SEL4 to SEL8 are inactive during the driving period TS2. Similarly, during the respective driving periods TS3, TS4, TS5, TS6, TS7, and TS8, the switch-control-signal output circuit 160 outputs active switch control signals SEL6, SEL5, SEL8, SEL2, SEL7, and SEL1, and the amplifier circuit AMi outputs data voltages VID6, VID5, VID8, VID2, VID7, and VID1.

In the horizontal scanning period THSE subsequent to the horizontal scanning period THSD, the switch-control-signal output circuit 160 outputs active switch control signals SEL1 to SEL8, and the amplifier circuit AMi outputs a data voltage VID3, during the driving period TS1. During the respective driving periods TS2, TS3, TS4, TS5, TS6, TS7, and TS8, the switch-control-signal output circuit 160 outputs active switch control signals SEL6, SEL5, SEL8, SEL2, SEL7, SEL1, and SEL4, and the amplifier circuit AMi outputs data voltages VID6, VID5, VID8, VID2, VID7, VID1, and VID4.

In the horizontal scanning period THSF subsequent to the horizontal scanning period THSE, the switch-control-signal output circuit 160 outputs active switch control signals SEL1 to SEL8, and the amplifier circuit AMi outputs a data voltage VID6, during the driving period TS1. During the respective driving periods TS2, TS3, TS4, TS5, TS6, TS7, and TS8, the switch-control-signal output circuit 160 outputs active switch control signals SEL5, SEL8, SEL2, SEL7, SEL1, SEL4, and SEL3, and the amplifier circuit AMi outputs data voltages VID5, VID8, VID2, VID7, VID1, VID4, and VID3.

Following this, similarly, the first pixel driven in the horizontal scanning period is shifted by one for each frame, and a cycle is completed in eight frames. It should be noted that, in the horizontal scanning period before the horizontal scanning period THSD, the switch-control-signal output circuit 160 outputs active switch control signals SEL1 to SEL8, and the amplifier circuit AMi outputs a data voltage VID1, during the first driving period TS1 in the horizontal scanning period. During the respective driving periods TS2, TS3, TS4, TS5, TS6, TS7, and TS8, the switch-control-signal output circuit 160 outputs active switch control signals SEL4, SEL3, SEL6, SEL5, SEL8, SEL2, and SEL7, and the amplifier circuit AMi outputs data voltages VID4, VID3, VID6, VID5, VID8, VID2, and VID7.

In the example in FIG. 6, the basic driving order of the pixels is P1j, P4j, P3j, P6j, P5j, P8j, P2j, and P7j, and the first pixel driven in the horizontal scanning period is rotated. Then, pre-charge is carried out with the data voltage of the first pixel driven in the rotation.

In the above-described exemplary embodiment, the switch-control-signal output circuit 160 outputs switch control signals SEL1 to SEL8 that turn on two or more switches including a switch SDp (p-th switch (where p is an integer within the range of 2 to n, inclusive)) different from the switch SD1 during the driving period TS1 in the horizontal scanning period. The amplifier circuit AMi then outputs a data voltage VIDp (p-th data voltage) during the driving period TS1.

In the example in FIG. 5, two or more switches including the switch SD2 is turned on, and the amplifier circuit AMi outputs a data voltage VID2, during the driving period TS1 in the horizontal scanning period THSA. In the example in FIG. 6, two or more switches including the switch SD4 is turned on, and the amplifier circuit AMi outputs a data voltage VID4, during the driving period TS1 in the horizontal scanning period THSD. Here, the horizontal scanning periods THSA and THSD are each a horizontal scanning period subsequent to the horizontal scanning period in which two or more switches including the switch SD1 are turned on during the driving period TS1. Here, the term "horizontal scanning period subsequent to the previous horizontal scanning period" refers to the horizontal scanning period in which the scanning line (GLj+1) is driven subsequent to the scanning line (GLj in FIG. 2) in a horizontal scanning period.

According to this exemplary embodiment, when rotation of the driving order of demultiplex driving is carried out, pre-charge operations corresponding to the driving order can be carried out. That is, during the driving period TS1 in the horizontal scanning period during which the first pixel in the driving order is driven, a data voltage can be written in the pixel while one or more pixels (and data lines connected to the respective pixels) can be pre-charged with the data voltage.

It should be noted that all of the switches SD1 to SD8 of the demultiplexer DMX are turned on during the driving period TS1 in FIGS. 5 and 6. However, the number of switches turned on is not limited thereto, as long as two or more switches including the switch turned on during the first driving period in any of the horizontal scanning periods THSA to THSF is turned on.

Figure 7:
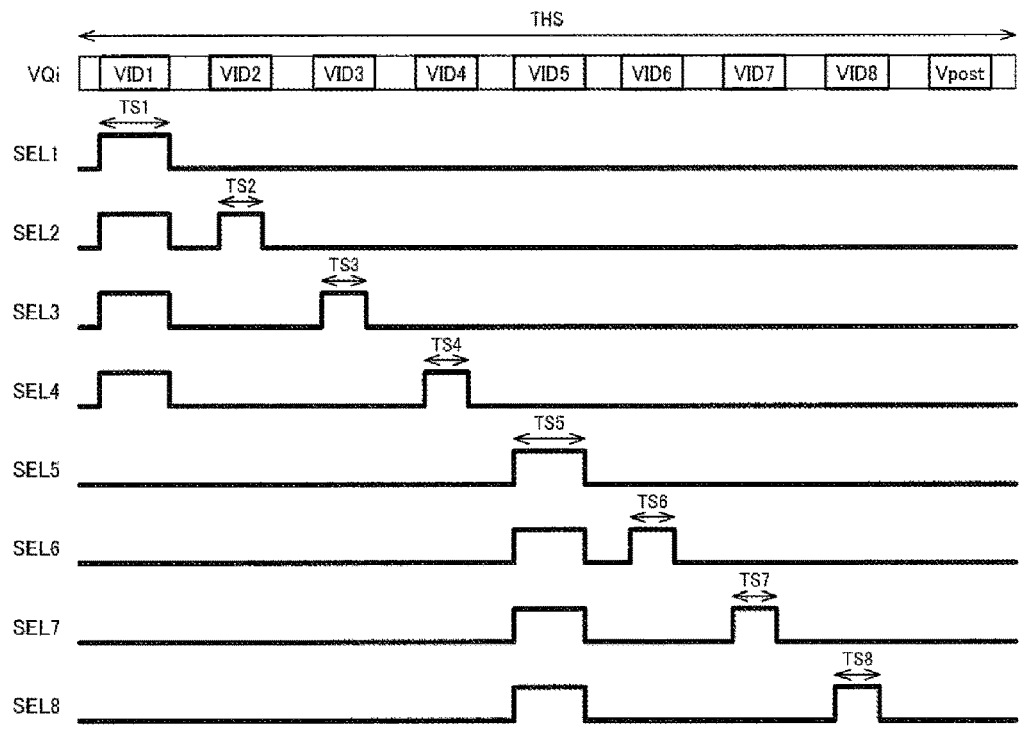
FIG. 7 illustrates a timing chart depicting an operation performed when pre-charge is carried out multiple times.

FIG. 7 illustrates a timing chart depicting an operation performed when pre-charge is carried out multiple times.

In FIG. 7, during the driving period TS1 in the horizontal scanning period THS, the switch-control-signal output circuit 160 outputs active switch control signals SEL1 to SEL4, and the amplifier circuit AMi outputs a data voltage VID1. The switch control signals SEL5 to SEL8 are inactive during the driving period TS1. When the pixels P1j to P8j are selected in the horizontal scanning period THS, the pixels P1j to P4j and the data lines SL1 to SL4 are charged with the data voltage VID1. During the respective driving periods TS2, TS3, and TS4, the switch-control-signal output circuit 160 outputs active switch control signals SEL2, SEL3, and SEL4, and the amplifier circuit AMi outputs data voltages VID2, VID3, and VID4.

During the driving period TS5, the switch-control-signal output circuit 160 outputs active switch control signals SEL5 to SEL8, and the amplifier circuit AMi outputs a data voltage VID5. The switch control signals SEL1 to SEL4 are inactive during the driving period TS5. When the pixels P1j to P8j are selected in the horizontal scanning period THS, the pixels P5j to P8j and the data lines SL5 to SL8 are charged with the data voltage VID5. During the respective driving periods TS6, TS7, and TS8, the switch-control-signal output circuit 160 outputs active switch control signals SEL6, SEL7, and SEL8, and the amplifier circuit AMi outputs data voltages VID6, VID7, and VID8.

In the exemplary embodiments described above, the switch-control-signal output circuit 160 outputs switch control signals SEL1 to SEL8 that turn on the first to k-th switches (where k represents an integer within the range of 2 to n−2, inclusive) during the driving period TS1 (first driving period). The amplifier circuit AMi outputs a data voltage VID1 (first data voltage) during the driving period TS1. Furthermore, during the (k+1)th driving period, the amplifier circuit AMi outputs the switch control signals SEL1 to SEL8 that turn on the (k+1)th to q-th switches (where q represents an integer within the range of k+2 to n, inclusive). The amplifier circuit AMi outputs a (k+1)th data voltage during the (k+1)th driving period.

In the example in FIG. 7, the first to k-th switches respectively correspond to switches SD1 to SD4. Furthermore, the (k+1)th driving period corresponding to the driving period TS5, the (k+1)th to q-th switches respectively correspond to the switches SD5 to SD8, and the (k+1)th data voltage corresponds to the data voltage VID5. The length of the first driving period (TS1) is larger than the length of each of the second to k-th driving periods (TS2 to TS4 in FIG. 7), and the length of the (k+1)th driving period (TS5 in FIG. 7) is larger than the length of each of the (k+2)th to q-th driving periods (TS5 to TS8 in FIG. 7).

According to the exemplary embodiments, n pixels driven in a horizontal scanning period can be divided into multiple groups, and each group can be pre-charged. In the example in FIG. 7, the eight pixels P1j to P8j are divided into a group of pixels P1j to P4j and a group of pixels P5j to P8j, and each group can be pre-charged separately. Since the load on the amplifier circuit AMi during pre-charge is reduced, the differences in the data voltages written in the pixels during the driving periods TS1 and TS5 also provided as the pre-charge period can be reduced. Otherwise, the length of each of the driving periods TS1 and TS5 also provided as the pre-charge period can be reduced in comparison to the length of the driving period TS1 in FIG. 4.

Figure 8:
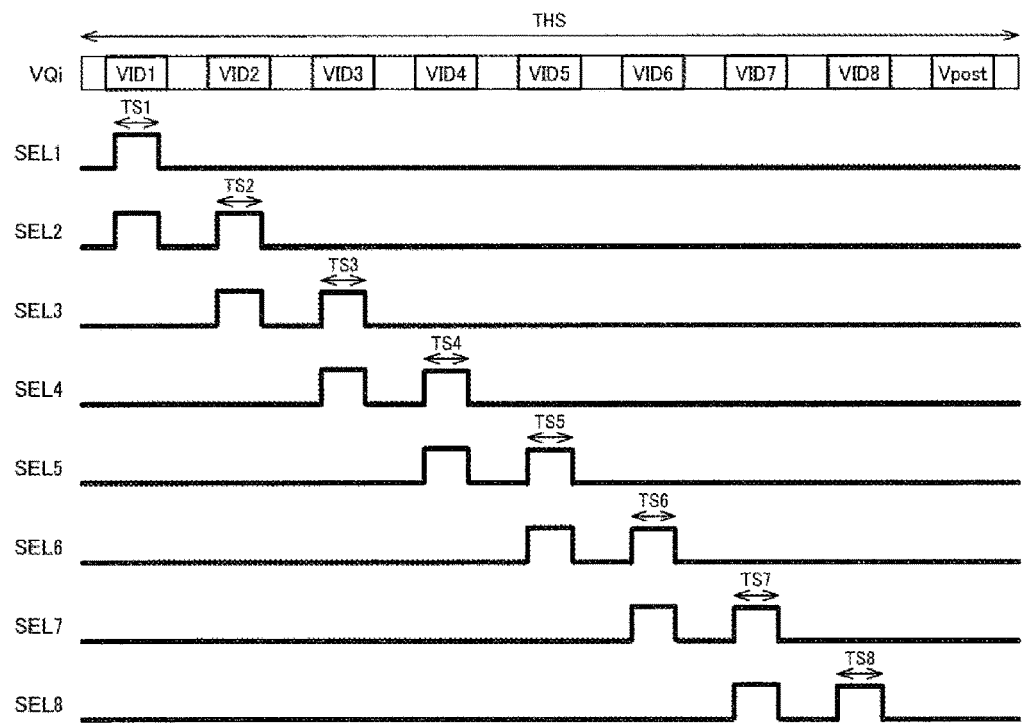
FIG. 8 illustrates a timing chart depicting an operation performed when pre-charge is carried out on a pixel subsequent to the pixel in which the data voltage is written in the driving order.

FIG. 8 illustrates a timing chart depicting an operation performed when pixels driven subsequent to the pixel to which a data voltage is written is pre-charged with a data voltage.

In FIG. 8, during the driving period TS1 in the horizontal scanning period THS, the switch-control-signal output circuit 160 outputs active switch control signals SEL1 and SEL2, and the amplifier circuit AMi outputs a data voltage VID1. The switch control signals SEL3 to SEL8 are inactive during the driving period TS1. When the pixels P1j to P8j are selected in the horizontal scanning period THS, the pixels P1j and P2j and the data lines SL1 and SL2 are charged with the data voltage VID1. During the driving period TS2, the switch-control-signal output circuit 160 outputs active switch control signals SEL2 and SEL3, and the amplifier circuit AMi outputs the data voltage VID2. Following this, driving of a pixel and pre-charge to the subsequent pixel in order is repeated to the driving period TS7 in order. During the driving period TS8, the switch-control-signal output circuit 160 outputs an active switch control signal SEL8, and the amplifier circuit AMi outputs the data voltage VID8. The switch control signals SEL1 to SEL7 are inactive during the driving period TS1.

In the exemplary embodiments described above, the switch-control-signal output circuit 160 outputs the switch control signals SEL1 to SEL8 that turn on the r-th and r+1-th switches during the r-th driving period (where r represents an integer within the range of 1 to n−1, inclusive). The amplifier circuit AMi then outputs the r-th data voltage during the r-th driving period.

In the example in FIG. 8, the r-th driving period corresponds to the driving period TSr (where r represents an integer within the range of 1 to 7, inclusive). Furthermore, the r-th corresponds to the switch SDr, and the (r+1)th switch corresponds to the switch SDr+1. Furthermore, the r-th data voltage corresponds to the data voltage VIDr. For example, during the driving period TS1, switch control signals SEL1 to SEL8 that turn on the switches SD1 and SD2 are output, and the amplifier circuit AMi outputs a data voltage VID1.

According to the exemplary embodiments, while a data voltage is written in a pixel, the subsequent pixel in the driving order can be pre-charged with the data voltage. Since the polarities of the data voltages in the same horizontal scanning period are the same, a data voltage having the same polarity as that of the data voltage written in the subsequent pixel in the driving order is pre-charged, and writing assistance can be carried out. Furthermore, since the amplifier circuit AMi drives two pixels each, the fluctuation in the load on the amplifier circuit AMi during writing of the data voltage to each pixel can be decreased. Furthermore, since the amplifier circuit AMi needs to drive only two pixels each, there is a possibility that the circuit size and the power consumption of the amplifier circuit AMi can be reduced, and the length of each of the driving periods TS1 to TS8 can be decreased.

4. Electrooptic Device And Electronic Apparatus

Figure 9:
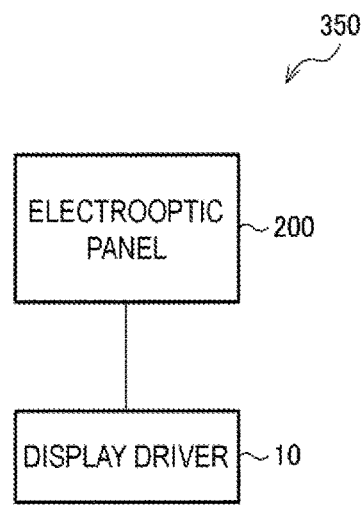
FIG. 9 illustrates an example configuration of an electrooptic device.

FIG. 9 illustrates an example configuration of an electrooptic device 350 including a display driver 10. The electrooptic device 350 includes a display driver 10 and an electrooptic panel 200.

The electrooptic panel 200 is, for example, an active matrix type liquid crystal display panel. For example, the display driver 10 is mounted on a flexible substrate, the flexible substrate is connected to the electrooptic panel 200, and the image-signal output terminals of the display driver 10 and the image-signal input terminals of the electrooptic panel 200 are connected via lines formed on the flexible substrate. Alternatively, the display driver 10 may be mounted on a rigid substrate (printed substrate), the rigid substrate may be connected to the electrooptic panel 200 via a flexible substrate, and the image-signal output terminals of the display driver 10 and the image-signal input terminals of the electrooptic panel 200 may be connected via lines formed on the flexible substrate.

Figure 10:
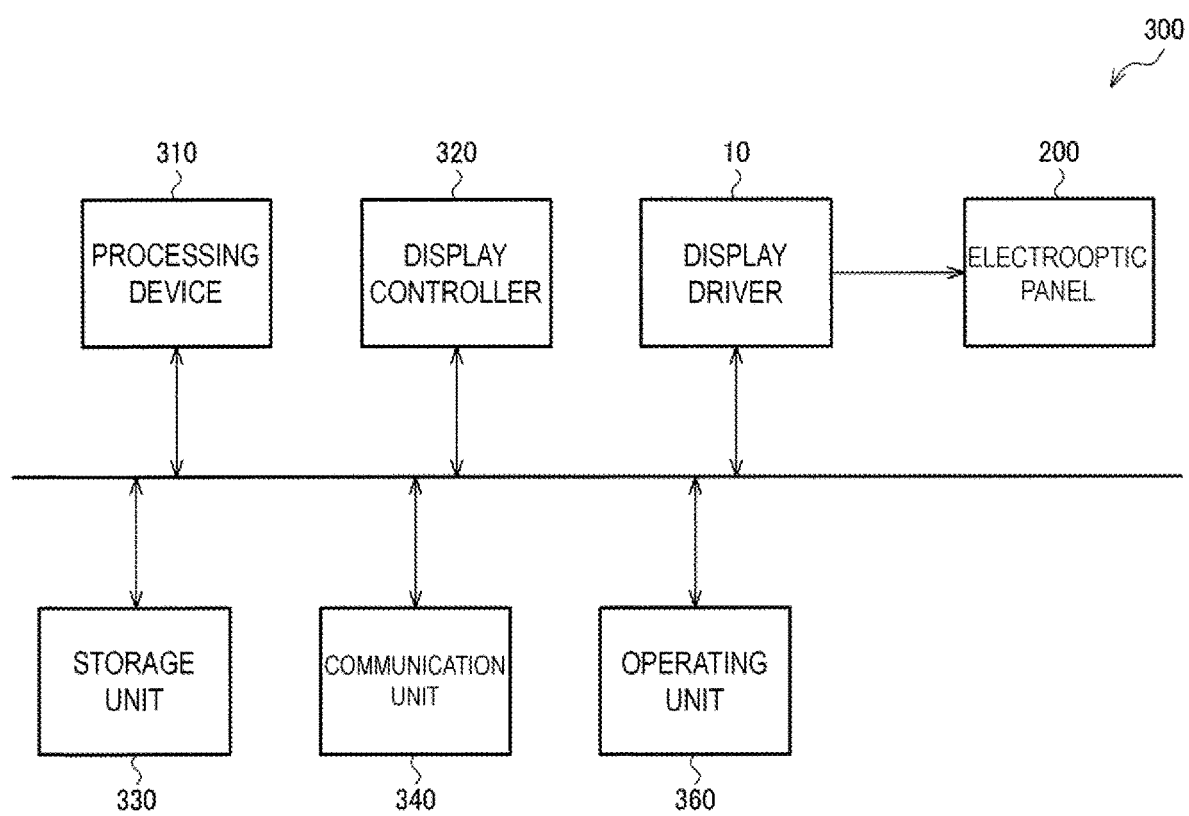
FIG. 10 illustrates an example configuration of an electronic apparatus.

FIG. 10 illustrates an example configuration of an electronic apparatus 300 including a display driver 10. The electronic apparatus 300 includes a processing device 310, a display controller 320, a display driver 10, an electrooptic panel 200, a storage unit 320 (storage device, memory), a communication unit 340 (communication circuit, communication device), and an operation unit 360 (operation device). Specific examples of the electronic apparatus 300 may include various electronic apparatuses provided with display devices, such as a projector, a head-mounted display, a mobile information terminal, a vehicle-mounted device (for example, a meter panel or a car navigation system), a portable game terminal, and an information processing device.

The operating unit 360 is a user interface that accepts various types of operations from a user. For example, the operating unit 360 is a button, a mouse, a keyboard, and/or a touch panel mounted on the electrooptic panel 200. The communication unit 340 is a data interface that inputs and outputs image data and control data. Examples of the communication unit 340 include a wireless communication interface, such as a wireless LAN interface or a near field communication interface, and a wire communication interface, such as wired LAN interface or a USB interface. The storage unit 330, for example, stores data input from the communication unit 340 or functions as a working memory for the processing device 310. The storage unit 330 is, for example, a memory, such as a RAM or a ROM, a magnetic storage device, such as an HDD, or an optical storage device, such as a CD drive or a DVD drive. The display controller 320 processes image data (display data) input from the communication unit 340 or stored in the storage unit 330 and transfers the processed image data to the display driver 10. The display driver 10 displays an image on the electrooptic panel 200 on the basis of the image data transferred from the display controller 320. The processing device 310 carries out control processing for the electronic device 300 and various types of signal processing. The processing device 310 is, for example, a processor, such as a CPU or an MPU, or an ASIC.

For example, in a case where the electronic apparatus 300 is a projector, the electronic apparatus 300 further includes a light source and an optical device (for example, a lens, a prism, or a mirror). In the case where the electrooptic panel 200 is of a transmissive type, the optical device emits light from the light source to the electrooptic panel 200, and the light transmitted through the electrooptic panel 200 is projected on a screen. In the case where the electrooptic panel 200 is of a reflective type, the optical device emits light from the light source to the electrooptic panel 200, and the light reflected at the electrooptic panel 200 is projected on a screen.

Although some exemplary embodiments have been described in detail above, those skilled in the art will understand that many modified examples can be made without substantially departing from the novel matter and effects of the invention. All such modified examples are thus included in the scope of the invention. For example, terms in the descriptions or drawings given even once along with different terms having identical or broader meanings can be replaced with those different terms in all parts of the descriptions or drawings. All combinations of the exemplary embodiments and modified examples are also included within the scope of the invention. Furthermore, the configurations and operations of the display driver, the electrooptic device, and the electronic apparatus are not limited to those described in the exemplary embodiments, and various modifications thereof are possible.

The entire disclosure of Japanese Patent Application No. 2018-008553, filed Jan. 23, 2018 is expressly incorporated by reference herein.

What is claimed is:

1. A display driver comprising:
an amplifier circuit configured to output, in time series, first to n-th data voltages to an image-signal input terminal of an electro-optic panel during first to n-th driving periods in a first horizontal scanning period, where n represents an integer of 4 or more; and
a switch-control-signal output circuit configured to:
output switch control signals for controlling first to n-th switches disposed between the image-signal input terminal of the electro-optic panel and respective first to n-th data lines, including a p-th switch different from the first switch among the first to n-th switches, where p represents an integer within the range of 3 to n−1, inclusive;
output the switch control signals that turn on the first switch connected between the image-signal input terminal and the first data line, and a first other switch among the first switch to a (p−1)th switch connected between the image-signal input terminal and its corresponding data line, during the first driving period among the first to n-th driving periods; and output the switch control signals that turn on the p-th switch connected between the image-signal input terminal and the p-th data line, and a second other switch among the p-th switch to the n-th switch connected between the image-signal input terminal and its corresponding data line, during a p-th driving period among the first to n-th driving periods, wherein the amplifier circuit is configured to output:

the first data voltage fed to the first data line, among the first to n-th data voltages, during the first driving period to the first data line and the first other data line; and a p-th data voltage fed to the p-th data line, among the first to n-th data voltages, during the p-th driving period to the p-th data line and the second other data line;

wherein the switch-control-signal output circuit is configured to:

output the switch control signals that turn on the first to (p−1)th switches connected between the image-signal input terminal and the first to (p−1)th data lines, respectively, during the first driving period; and output the switch control signals that turn on the p-th to n-th switches connected between the image-signal input terminal and the p-th to n-th data lines, respectively, during the p-th driving period, and the amplifier circuit is configured to:

output the first data voltage, fed to the first data line, to the first to (p−1)th data lines during the first driving period; and output the p-th data voltage, fed to the p-th data line, to the p-th to n-th data lines during the p-th driving period.

2. The display driver according to claim 1, wherein the switch-control-signal output circuit is configured to output the switch control signals for turning on two or more of the switches including the p-th switch during the first driving period in a second horizontal scanning period subsequent to the first horizontal scanning period, and the amplifier circuit is configured to output the p-th data voltage among the first to n-th data voltages during the first driving period.

3. The display driver according to claim 1, wherein the switch-control-signal output circuit is configured to output the switch control signals for turning on the first to n-th switches during the first driving period, and the switch-control-signal output circuit is configured to output the switch control signals for turning on an i-th switch, where i represents an integer within the range of 2 to n, inclusive, among the first to n-th switches and turning off the switches other than the i-th switch during an i-th driving period among the first to n-th driving periods.

4. The display driver according to claim 3, wherein a length of the first driving period is larger than a length of the i-th driving period.

5. The display driver according to claim 1, wherein the switch-control-signal output circuit is configured to output the switch control signals for turning on the first to k-th switch, among the first to n-th switches during the first driving period, where k represents an integer within the range of 2 to n−2, inclusive, the switch-control-signal output circuit is configured to output the switch control signals for turning on k+1-th to q-th switches among the first to n-th switches during a (k+1)th driving period among the first to n-th driving periods, where q represents an integer within the range of k+2 to n, inclusive, and the amplifier circuit is configured to output a (k+1)th data voltage among the first to n-th data voltages during the (k+1)th driving period.

6. The display driver according to claim 1, wherein the switch-control-signal output circuit is configured to output the switch control signals for turning on an r-th and (r+1)th switches during an r-th driving period among the first to n-th driving periods, where r represents an integer within the range of 1 to n−1, inclusive, and the amplifier circuit is configured to output an r-th data voltage among the first to n-th data voltages during the r-th driving period.

7. The display driver according to claim 1, further comprising:

a D/A converter circuit configured to D/A-convert the first to n-th display data and output time-divided first to n-th D/A converted voltages, wherein the amplifier circuit is configured to output the first to n-th data voltages corresponding to the time-divided first to n-th D/A converted voltage during the first to n-th driving periods, respectively.

8. The display driver according to claim 1, wherein the amplifier circuit is configured to output the first to n-th data voltages having a positive or negative polarity in the horizontal scanning period, and the amplifier circuit is configured to output the first to n-th data voltages having the other one of the positive and negative polarities in a second horizontal scanning period one frame after the first horizontal scanning period.

9. An electronic apparatus comprising:
the display driver according to claim 1; and
an electro-optic panel driven by the display driver.

10. An electronic apparatus comprising:
the display driver according to claim 1.

11. The display driver according to claim 1, wherein a length of the first driving period is longer than lengths of the second to n-th driving periods.

12. The display driver according to claim 1, wherein n represents a total number of driving periods in the first horizontal scanning period.

* * * * *